United States Patent Office 3,772,264

Patented Nov. 13, 1973

1

3,772,264

HOMOGENEOUS PEPTIDE SYNTHESIS

Ernst Bayer and Manfred Mutter, Tubingen, Germany, and Dieter Gillessen, Birsfelden, Hans Künzi, Riehen, and Rolf Studer, Bottmingen, Switzerland, assignors to Hoffmann-La Roche Inc., Nutley, N.J.

No Drawing. Filed Sept. 17, 1971, Ser. No. 181,609
Claims priority, application Germany, Sept. 26, 1970, P 20 47 413.9
Int. Cl. C07c *103/52*; C07g *7/00*; C08h *1/00*
U.S. Cl. 260—112.5 9 Claims

ABSTRACT OF THE DISCLOSURE

Peptides are prepared in a homogeneous system by coupling a first amino acid to a soluble polymer support and thereafter coupling additional amino acids in desired sequence until the ultimate peptide is obtained. Reagents used in the intermediate steps are readily separated from the coupled polymer-amino acid chain by selective filtration techniques. In the final step the desired peptide is cleaved from the polymer support and separated from the soluble polymer by use of ultrafiltration.

BRIEF DESCRIPTION OF THE INVENTION

The present invention relates to a new method for the preparation of peptides wherein an amino acid is coupled through either an ester or amide bond (i.e., C-terminal or N-terminal) to a polymer material which is soluble in either water or in suitable organic solvents. The polymer-amino acid couple is then treated stepwise in homogenous phase with the required sequence of amino acids so as to couple them into a chain representing the product peptide. The final stage of the procedure involves splitting off of the peptide product from the suitable polymer support and separating the support from the product peptide.

Suitable polymers for use in the present invention include polycondensation or polymerization matrices containing heteroatom functions. These heteroatom functions can contain oxygen, such as the ether groups in polyethylene glycols, the hydroxyl groups in polyvinyl alcohols and the ester groups in polyacrylates. Additionally, the heteroatom functions can contain nitrogen such as the amino groups of polylysine. Additionally, the heteroatom functions can contain more than one heteroatom such as, for example, the acid amide groups.

Examples of specific polymers useful herein include polyethyleneglycol, polyethyleneglycol esterified with citric acid, copolymers of polyethyleneglycol and succinic acid; of vinylpyrrolidone and acrylic acid or β-hydroxyethylacrylate; or of acrylamide and vinyl acetate.

The preparation of the starting materials employed in the process of the present invention that is the polymers to which an amino acid is bonded through an ester or amide linkage may be readily accomplished using procedures well known in the art. Thus, an amino acid bearing a protected amino group can be esterified with the polymer, i.e., a polyethyleneglycol or a copolymer of acrylamide and vinyl acetate whose acetate groups are at least

2 partially saponified, using well known procedures of the peptide chemical art and thereafter the amino protecting group is removed. In an alternate procedure for the preparation of the starting material of the present invention the C-terminal amino acid of the peptide to be synthesized is bonded through an ester bond to a monomer, such as, for example, through the reaction of the silver salt of the amino acid with monoiodosuccinic acid, and the resulting product is subjected to a polycondensation with polyethyleneglycol. Alternatively, it is possible to condense maleic acid with polyethyleneglycol, to then add hydrogen iodide to the maleic acid groups in the polycondensation product and to react the resulting iodine compound with the silver salt of the amino acids. In a preferred embodiment a polyethyleneglycol product is used in the polycondensation, which product is obtained by condensing polyethyleneglycol with butyloxycarbonylglycine and then removing the butyloxycarbonyl protecting group.

The coupling of the desired sequence of amino acids to the terminal amino acid-polymer support can be accomplished in homogeneous phase in either aqueous or organic solvent medium utilizing well known procedures which are described in detail in the literature such as in Schröder-Lübke, The Peptides, New York, 1967.

Following each coupling step, the smaller molecules of the coupling reagents can be readily removed by means of conventional dialysis, membrane filtration, chromatography or counter-current distribution techniques. It is this feature of ease of separation between the amino acid-polymer couple and the coupling reagents which provides the method of the present invention with a substantial advantage over previously known peptide synthesis procedures. In order to obtain best yields during the separation procedure, it is preferable to use as starting material polymers having a molecular weight in the range of from about 10,000 to about 100,000.

The above separation procedure can be conducted in a manner known per se. In the dialysis or membrane filtration commercially available membranes can be used which have pore sizes which will selectively retain materials of molecular weights of the range that the polymers used in the instant method have. For example, it is preferred to use membranes which retain a polymer of molecular weight in the range of 20,000 to 100,000 and which are permeable to materials having a molecular weight up to 10,000.

When using column chromatography in the separation procedure suitable column materials which can be employed include, for example, polydextrane (Sephadex®) and polyacrylamide (Biogel®).

The removal of the product peptide from the polymer support can be readily accomplished using techniques well known in the art. For example, cleavage can be obtained by treating the product peptide-polymer couple with base, such as, dilute alkali metal hydroxides or with dilute acids, such as dilute mineral acids or by aminolysis, e.g. by treatment with ammonia in an organic solvent.

It is to be understood in the practice of the present invention that selection of particular polymer starting materials from the groups enumerated previously is within the skill of the art and will be based on consideration of the molecular weight as well as the solubility properties (that is solubility in water or organic solvents) of the polymer. Separation of the peptide from the polymer may be accomplished by selective filtration procedures described herein such as ultrafiltration, dialysis, column chromatography and the like.

The present invention is more clearly understood by reference to the following examples in which the following abbreviations have the indicated meanings below:

| | |
|---|---|
| Pyroglu | Pyroglutamyl. |
| Ile | Isoleucyl. |
| Leu | Leucyl. |
| Ala | Alanyl. |
| Val | Valyl. |
| Gly | Glycyl. |
| Gln | Glutaminyl. |
| Thr | Threonyl. |
| ONP | p-Nitrophenyl. |
| BOC | Tert.-butoxycarbonyl. |
| PEG | Polyethyleneglycol. |
| DCC | Dicyclohexylcarbodimide. |
| PCP | Pentachlorophenyl. |
| MW | Molecular weight. |
| i.v. | In vacuo. |
| Z | Benzyloxycarbonyl. |

EXAMPLE 1

(a) Esterification of BOC-Val-OH with PEG MW 20,000

20 g. of PEG NW 20,000, 4.34 g. of BOC-Val-OH and 4.12 g. of DCC were dissolved in 200 ml. of methylene chloride and the solution was stirred at room temperature for 5½ days with exclusion of moisture The reaction mixture was then evaporated to dryness i.v., treated with 400 ml. of 4 N HCl/dioxane and stirred at room temperature for 30 minutes and thereafter again evaporated to dryness i.v. The residue was taken up in about 1 liter of water and the resulting precipitate was removed with the assistance of a filter aid. The filtrate was adjusted to pH 6 with sodium hydroxide or triethylamine and was then ultrafiltered through a Diaflo® Ultrafilter UM-10 until there is no longer any trace of free valine in the residual solution. The residue from the ultrafiltration was evaporated to dryness i.v. with the help of benzene/absolute ethanol (80/20), reevaporated to dryness and then the residue was dried overnight in a dessicator to constant weight.

Yield 19.35 g. H-Val-PEG. Site utilization: 80% corresponding to 0.08 mM/g. (amino acid analysis).

(b) Peptide synthesis 5 g. of H-Val-PEG was dissolved in 50 ml. of methylene chloride and was treated with 0.1 ml. of triethylamine. Then together with 0.44 g. of BOC-Gly-OH (2.5 mM.) and 0.515 g. of DCC (2.5 mM.), the solution was stirred for two hours at room temperature, thereafter evaporated to dryness i.v., treated over 30 minutes at room temperature with 40 ml. of 4 N HCl/dioxane and then again evaporated to dryness i.v. The oily residue was taken up in 500–700 ml. of water. After removal of the resulting precipitate the filtrate was adjusted to pH 6 with sodium hydroxyide or triethylamine and ultrafiltered through a Diaflo® Ultrafilter UM-2. The residue from the ultrafiltration was evaporated to dryness i.v., redried with the help of benzene/absolute ethanol (80/20) and the residue dried overnight in a dessicator to constant weight.

Yield: 4.85 g. of H-Gly-Val-PEG.

Utilizing the same procedure described above H-Gly-Val-PEG was first treated with triethylamine and then reacted with 2.5 mM. BOC-Ala-OH and DCC. After splitting off the protecting group and ultrafiltration there are obtained 4.75 g. of H-Ala-Gly-Val-PEG. Corresponding reaction of this product with BOC-Leu-OH and DCC in the same manner results in the production of H-Leu-Ala-Gly-Val-PEG (4.5 g.). The amino acid analysis of a hydrolyzed sample of this material gave the following amino acid ratio:

Val:Gly:Ala:Leu=1.08:1.00:0.90:1.04

(c) Removal of the tetrapeptide from the support

A solution containing 4.0 g. of H-Leu-Ala-Gly-Val-PEG in 75 ml. of water and 1.5 ml. of 1 N KOH was stirred for two hours at room temperature. The solution was neutralized with 1.5 ml. of 1 N HCl, and then was ultrafiltered through a Diaflo® Ultrafilter UM-10 until 3.5 liters of filtrate was collected. Evaporation of the filtrate i.v. yielded 280 mg. of crude product which through digestion with absolute methanol was partially freed of sodium chloride. The methanol phase was decolored with charcoal, filtered and the filtrate evaporated to dryness. The residue was taken up in water and lyophilized. There was obtained 191.5 mg. of crude tetrapeptide which according to amino acid analysis showed the following ratio:

Val:Gly:Ala:Leu=1.03:1.00:0.85:1.07

The peptide content in the crude tetrapeptide amounted to 35% (amino acid analysis) which based on the first amino acid (Val) amounted to a total yield of 45%.

Thin-layer chromatography of this material compared with authentic H-Leu-Ala-Gly-Val-OH (prepared by the Merrifield method) established the identity of the above product. R*f* in butanol/acetic acid/water/ethyl acetate 1/1/1/1: 0.52; R*f* in butanol/acetic acid/water 4/1/1: 0.36; R*f* in butanol/acetic acid/water/pyridine 15/3/12/10: 0.45.

EXAMPLE 2

(a) To 4.34 g. of BOC-Val-OH and 2.8 ml. of triethylamine in 80 ml. of methylene chloride there was added dropwise with stirring at −5° C. 191 ml. of chlorocarbonic acid ethyl ester in 20 ml. of methylene chloride. The solution was stirred an additional 30 minutes at −5° C. and then a cold (−5° C.) solution of 20 g. of PEG MW 20,000 and 2.4 g. (20 mM.) of dimethylaminopyridine in 100 ml. of methylene chloride was added. The reaction mixture was stirred for one hour at −5° C. and then at room temperature for 65 hours. In order to block unreacted OH-functions the reaction mixture was stirred for four hours with 10 mM. acetic anhydride and 10 mM. triethylamine and then evaporated to dryness i.v. The residue was treated for 30 minutes at room temperature with 100 ml. of 4 N HCl/dioxane, evaporated to dryness i.v. and taken up in approximately 1 liter of water. After filtration and adjustment of the pH (as in Example 1(a)) the solution was ultrafiltered and worked up as before.

Yield: 19 g. H-Val-PEG. Site utilization: 60% corresponding to 0.06 mM./g. (amino acid analysis).

(b) Starting with 12.7 g. H-Val-PEG the described tetrapeptide of Example 1(b) was prepared in the same manner. Reagents: 1 mM. triethylamine, 4.0 mM. BOC-amino acid, 4.0 mM. DCC. There was obtained 11.5 g. of H-Leu-Ala-Gly-Val-PEG which exhibited the following amino acid ratio on analysis:

Val:Gly:Ala:Leu=0.88:0.86:1.11:1.00

(c) Following the procedure in Example 1(c) 10 g. of H-Leu-Ala-Gly-Val-PEG was hydrolyzed in 100 ml. of water and 3 ml. of 1 N KOH. After neutralization, ultrafiltration and work-up there was obtained 300 mg. of crude tetrapeptide having the following amino acid ratio:

Val:Gly:Ala:Leu=0.96:0.91:1.24:1.00

The peptide content in the crude tetrapeptide amounted to 41% (amino acid analysis) which based on the first amino acid (Val) indicated a total yield of 50% of theory.

EXAMPLE 3

6 g. of H-Val-PEG (80%, 0.5 mM. Val, see Example solved in 60 ml. of methylene chloride, treated with 1.05 g. of BOC-Gly-ONP (3.5 mM.) and the resulting mixture was stirred at room temperature for 24 hours. After evaporation i.v. the residue was stirred thirty minutes at room temperature in 60 ml. of trifluoroacetic acid/methylene chloride (1:1) and thereafter was again evaporated to dryness i.v. The residue was taken up in about 700 ml. of water, filtered and the filtrate adjusted to pH 6 with sodium hydroxide. After ultrafiltration (Diaflo® Ultrafilter UM–10) the product was worked up according to the procedure of Example 1(b).

Yield: 5.88 g. H-Gly-Val-PEG.

In analogous fashion to Example 1(b) the product H-Gly-Val-PEG obtained above was first treated with BOC-Ala-ONP and the resulting H-Ala-Gly-Val-PEG was treated with BOC-Leu-ONP. There was obtained 5.6 g. of H-Leu-Ala-Gly-Val-PEG having the following amino acid ratio:

Val:Gly:Ala:Leu=1.00:0.70:0.78:0.71

5.6 g. of H-Leu-Ala-Gly-Val-PEG was in accordance with the procedure of Example 1(c) hydrolyzed and the resulting tetrapeptide worked up as before. There was obtained 250 mg. of crude tetrapeptide of the following amino acid analysis:

Val:Gly:Ala:Leu=1.00:0.83:0.93:0.88

The peptide content in the crude tetrapeptide amounted to 32% which based upon the first amino acid (Val) amounted to a total yield of 50% of theory.

EXAMPLE 4

(a) 10 g. of PEG MW 20,000, 1.75 g. BOC-Gly-OH and 2.06 g. of DCC were dissolved in 100 ml. of methylene chloride and the resulting solution stirred at room temperature for six days. The reaction mixture was evaporated to dryness i.v., treated with 100 ml. of 1.2 N HCl/glacial acetic acid and stirred at room temperature for 20 minutes.

The solution was distilled i.v., the residue treated with 100 ml. of water and the resulting precipitate centrifuged off. The clear supernatant was decanted off, adjusted to pH 6 with triethylamine and ultrafiltered through a Diaflo® Ultrafilter UM–10 until the ultrafiltrate no longer contained any glycine. The retained solution was evaporated i.v. and the residue twice azeotropically distilled with benzene so as to remove the last traces of water. The product was dried in a dessicator to constant weight.

Yield: 9.8 g. of H-Gly-PEG. Site utilization: 0.06 mM./g.

(b) 9.8 g. of H-Gly-PEG was dissolved in 60 ml. of methylene chloride and neutralized with 0.7 mM. N-methylmorpholine. In a separate vessel 3 mM. of BOC-Leu-OH was dissolved in a mixture of 5 ml. of methylene chloride and 1 ml. of dimethylformamide, this mixture was neutralized with 3 mM. N-methylmorpholine, cooled to −20° C. treated with 2.6 mM. isobutylchloroformate and stirred for 10 minutes at −20° C. The mixed anhydride was then added at −20° C. to H-Gly-PEG solution and stirred for one hour at −20° C. and two hours at 4° C. The solvent was then removed, the residue treated for 15 minutes at room temperature with 50 ml. of 1.2 N HCl/glacial acetic acid and evaporated to dryness i.v. The residue was taken up in 100 ml. of water, adjusted to pH 6 with aqueous sodium acetate solution and ultrafiltered through a Diaflo® Ultrafilter UM–10. The retained solution was evaporated to dryness i.v., azeotropically distilled twice with benzene and dried in a desiccator.

Yield: 9.5 g. of H-Leu-Gly-PEG.

Utilizing the same procedure the following amino acid derivatives were then coupled: BOC-Ala-OH, BOC-(OBz1)-Thr-OH, BOC-Leu-OH, BOC-Val-OH, BOC-(OBz1)-Thr-OH, BOC-Val-OH. After the last coupling step there was obtained 8.0 g. of

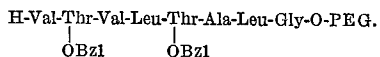

The amino acid analysis of a hydrolyzed sample of this material gave the following values:

Gly:Leu:Ala:Thr:Val=1.0:1.89:1.67:1.0

The amount of individual amino acids in each of the products of the intermediate steps could be determined by amino acid analysis.

EXAMPLE 5

(a) Citric acid was esterified with PEG MW 6,000 (3-fold excess of PEG based on the functional groups of citric acid) in the presence of an equimolar amount of DCC (based on PEG) in methylene chloride for a total of 3 days. The solvent was removed, the residue taken up in water and the resulting precipitate centrifuged off. The solution was then ultrafiltered (Amicon, UM–2 filter) until equilibrium. Yield: 80% of theory.

The polymer (dried) was then esterified with BOC-Val-OH in the presence of DCC (both components being present in five-fold excess based on 0.2 mM/g. functional groups of the polymer) in methylene chloride for a period of 3 days at room temperature. The site utilization of the polymer after the usual workup and splitting off of the BOC-groups with 4 N HCl/dioxane amounted to 0.2 mM./g.

(b) The following activated esters were prepared utilizing the DCC method:

(i) BOC-Leu-PCP
(ii) BOC-Gly-ONP
(iii) BOC-Gln-ONP

Coupling of these components was then accomplished utilizing the following procedure:

1 mM. (equal 5 g.) of H-Val-polymer was dissolved in 50 ml. of methylene chloride/dimethyl formamide (1:1). The solution was neutralized with 1.2 mM. N-methylmorpholine and treated with 3 mM. activated BOC-amino acid ester. After five minutes the solution was treated with an additional 1.2 mM. N-methylmorpholine and stirred for 2 hours at room temperature. The solvent was then distilled off i.v., the residue treated with 50 ml. of 4 N HCl/dioxane and the mixture allowed to stand at room temperature for 30 minutes. After distillation of the solvent the residue was taken up into a mixture of water/ethanol (3:1) and ultrafiltered with a Diaflo® Ultrafilter UM–2. The retained solution was taken to dryness and the residue was utilized in the next step: Yield of H-Gln-Gly-Leu-Val-polymer: 4 g. The results of an amino acid analysis on a hydrolyzed sample:

Val:Leu:Gly:Gln=1.0:0.9:1.0:0.98

2.0 g. of H-Gln-Gly-Leu-Val-polymer was stirred in 0.2 N KOH (50 ml.) for 4 hours at room temperature, neutralized with 2 N HCl and passed through a column of Sephadex® G25 (2.5 x 100 cm.). The crude peptide H-Gln-Gly-Leu-Val-OH was obtained in a yield of about 50%. The amino acid analysis gave the following values:

Val:Leu:Gly:Gln=1.0:0.88:1.05:0.92

EXAMPLE 6

(a) PEG MW 4,000 was esterified with a ten-fold excess of BOC-Gly-OH in the presence of DCC in methylene chloride over a period of five days at room temperature. Thereafter the protecting groups were removed, the solvent distilled off, the residue taken up in water and the resulting precipitate centrifuged off. The solution was then ultrafiltered with a Diaflo® Ultrafilter UM–2, the solvent distilled off from the retained solution.

The site utilization was determined through amino acid analysis to be about 100%.

Maleic acid was converted to maleic acid di-ONP-ester utilizing p-nitrophenol and DCC following the procedure described in Helv. Chim. Acta., 42, 2622 (1959). The yield was approximately 80% of theory, melting point 185–190° C. The double bond in the obtained maleic acid ester was treated with hydrogen iodide following the procedure of Org. Synth., 31, 66 (1951). The resulting monoiodo succinic acid-di-p-nitrophenyl ester was treated with the silver salt of BOC-Val-OH to yield BOC-Val-O-succinic acid-di-ONP-ester following the procedure of Ber., 42, I, 1937 (1909).

Equimolar amounts of PEG-Gly-H (neutralized with N-methylmorpholine) and BOC-Val-O-succinic acid di-ONP-ester were dissolved in methylene chloride/dimethylformamide (1:1) to produce a 10% solution and the resulting solution was stirred for 24 hours at room temperature. Thereafter the solvent was distilled off, the residue taken up in water and ultrafiltered (Diaflo® Ultrafilter UM–10) until the ultrafiltrate was negative to the tolidine test. The water of the retained solution was evaporated i.v. and the residue dried. The unreacted amino groups of H-Gly-PEG were then blocked by treatment with 3-sulfopropionic acid anhydride [Angew. Chem., 82, 937 (1970)]. The resulting product was then treated with 4 N HCl/dioxane to remove the BOC group. The molecular weight of the resulting polymer was over 20,000 (according to retention characteristics.)

(b) 2 g. of the above-obtained polymer and 6 mM. of BOC-Leu-PCP were stirred at room temperature in 20 ml. of methylene chloride/dimethylformamide (1:1) for 3 hours (after five minutes the reaction mixture was treated with 2 mM. of N-methylmorpholine). Then the solvent was distilled off i.v., the residue was treated for 20 minutes with 40 ml. of 4 N HCl/dioxane and the solvent again distilled off. The residue was taken up in 100 ml. of water and ultrafiltered (UM–10). The water was evaporated off and the residue dried. Yield: 1.9 g.

Analysis: Val:Leu=1.0:0.95.

(c) 0.9 g. of the above dipeptide-polymer was stirred for three hours at room temperature in 0.2 N aqueous KOH. Thereafter the solution was neutralized with 2 N HCl and ultrafiltered through a UM–10 filter. The tenfold amount of internal volume was collected (ultrafiltrate), the water evaporated off i.v. and the residue recovered: Yield of crude product: 350 mg. The peptide content amounted to 70% (amino acid analysis of a hydrolyzed sample). Analysis: Val:Leu=1.0:0.97.

EXAMPLE 7

BOC-Gly-OH was initially esterified with PEG MW 2,000 according to the procedure of Example 6(a). The removal of excess reactants was accomplished utilizing ultrafiltration with a Diaflo® filter UM–2 or by means of Sephadex® chromatography. There was thus obtained a product which in analogous fashion to Example 6 was polycondensed with maleic acid-di-ONP-ester. Hydrogen iodide was added to this condensation product and the iodinated product was reacted with the silver salt of BOC–Ala-OH.

As solvent it is possible to employ ether/dioxane. After the esterification the solvent was distilled off, the residue taken up in water and ultrafiltered (UM–10 filter). After evaporation of the retained solution, 95% of the esterified polymer was obtained. After removal of the protecting group the resulting product was coupled with BOC-Leu-PCP. The yield of dipeptide-polymer: 1.95 g.=93%, amino acid analysis: Ala:Leu=1.0:1.01.

Removal of the peptide from the polymer support produced 300 mg. of crude product; effective yield by amino acid analysis, 80% of theory. Amino acid analysis: Ala:Leu=1.0:1.0. The peptide was homogeneous by thin-layer chromatography (glacial acetic acid/butanol/water) (3:1:1).

EXAMPLE 8

(a) A total of 10 g. of PEG MW 20,000, 1.16 g. of BOC-Ile-OH and 1.03 g. of DCC was dissolved in 100 ml. of methylene chloride and stirred for 6 days at room temperature with exclusion of moisture. The reaction mixture was evaporated to dryness i.v., treated with 50 ml. of 4 N HCl/dioxane and stirred at room temperature for 30 minutes. After evaporation of the solvent the residue was taken up in 100 ml. of water and the resulting precipitate centrifuged off. The solution was decanted and adjusted to pH 6 with 2 N NaOH and ultrafiltered through a Diaflo® Ultrafilter UM–10. The retained solution was evaporated to dryness i.v., azeotropically distilled twice with benzene and dried in a desiccator. Yield: 9.8 g. of H-Ile-PEG; site utilization according to amino acid analysis: 0.07 mM./g. (70% of theory).

(b) The resulting product obtained according to (a) above was coupled in stepwise fashion with phenylalanine, valine and alanine according to the following reaction scheme:

(1) The polymer material in 10% aqueous solution was brought to pH 3.9 with 4 N NaOH or 5 N $H_2SO_4$ and cooled to 4° C.

(2) In a separate vessel the BOC-amino acid was dissolved (five-fold excess of the amine component) in 2–3 ml. of dimethylformamide and then added to the solution of (1) above keeping the pH constant at 3.9.

(3) At pH 3.9 and 4° C. with stirring, an equimolar amount, based on the BOC-amino acid, of N-cyclohexyl-N' - [β - (N - methyl - morpholino) - ethyl]-carbodiimide-p-toluolsulfonate was added and the pH maintained at 3.9 with 5 N $H_2SO_4$. After about 15 minutes the pH will no longer change.

(4) Adjust the pH to 7.0 with 4 N NaOH and stir 30 minutes at room temperature.

(5) Readjust the pH to 3.9 and treat again with an equimolar amount of the condensation material as described in (3) above.

(6) The solution was allowed to stand for 3–4 hours at pH 7.0 at room temperature.

(7) The solution was then ultrafiltered using a UM–10 filter.

Removal of the solvent i.v. of the retained solution yields the tetrapeptide-polymer.

(c) The tetrapeptide-polymer (9 g.) was treated with 2 N KOH in a water/dioxane mixture (9 g. in 50 ml.) for about 24 hours. Isolation was accomplished utilizing a Sephadex® G15 column (2.5 x 80 cm.) in aqueous solution after neutralization of the solution with dilute HCl. The water was distilled off at about 40° C., the residue taken up in methanol (salts remaining behind), the methanol was distilled off and the peptide dried. The yield of crude peptide H-Ala-Val-Phe-Ile-OH: approximately 300 mg. (not entirely free of salts). The amino acid analysis indicated a yield of about 0.5 mM. equivalent to 75% of theory (based on site utilisation). The results of the amino acid analysis after column chromatography:

Ile:Phe:Val:Ala=1.0:0.99:0.90:0.97

EXAMPLE 9

(a) 20 g. of PEG MW 20,000, 5.0 g. of Z-Val-OH and 4.2 g. of DDC are dissolved in 200 ml. of dichloromethane and stirred at room temperature for 10 days with the exclusion of moisture. The reaction mixture is then treated with 1.2 ml. of glacial acetic acid, stirred again for 20 hours and evaporated to dryness in vacuo. The residue is dissolved in 300 ml. of methanol, treated with 5 ml. of 4 N HCl/methanol and Pd/C and hydrogenated at room temperature and atmospheric pressure until the hydrogen-uptake ceases. The catalyst is filtered off, the filtrate is evaporated to dryness in vacuo, the residue is taken up in 1 liter of water and the resulting precipitate is separated.

The filtrate is ultrafiltered through a Diaflo UM–10 filter and processed in analogy to Example 1, section (a). Yield: 18.8 g. of H-Val-PEG·HCl. Coupling efficiency: 88% or 0.088 mM./g. (amino acid analysis).

(b) 10 g. of H-Val-PEG·HCl are dissolved in 50 ml. of dichloromethane. The solution is cooled to −20° and adjusted to pH 8–9 by the addition of 0.11 ml. of N-methylmorpholine. 1.05 g. of Z-Gly-OH are dissolved in 10 ml. of tetrahydrofuran, cooled to −20°, treated with 0.55 ml. of N-methylmorpholine and 0.65 ml. of isobutyl chloroformate and stirred for 5 minutes at −20°. This reaction mixture is added at −20° to the H-Val-PEG solution and the resulting mixture is stirred for 30 minutes below −20°, for 30 minutes below 0° and for 3 hours at room temperature. The reaction mixture is evaporated to dryness in vacuo, the residue is dissolved in 200 ml. of methanol, the solution is treated with 1.25 ml. of 4 N HCl/methanol and Pd/C and hydrogenated at room temperature and atmospheric pressure until the hydrogen-uptake ceases. The catalyst is filtered off, the filtrate is evaporated to dryness and the residue is taken up in 1 liter of water, filtered and ultra-filtered through a Diaflo UM–10 filter. The residue obtained after ultrafiltration is evaporated to dryness in vacuo, dried by means of benzene/absolute ethanol (80/20) and then over phosphorus pentoxide. Yield: 8.0 g. of H-Gly-Val-PEG·HCl.

In an analogous manner, 4.0 g. of H-Gly-Val-PEG·HCl are adjusted to pH 8–9 by the addition of 0.05 ml. of N-methylmorpholine and reacted with a solution of the mixed anhydride prepared from 500 mg. of Z-Ala-OH, 0.22 ml. of N-methylmorpholine and 0.26 ml. of isobutyl chloroformate in 5 ml. of tetrahydrofuran. After cleavage of the protecting group and ultrafiltration there are obtained 3.8 g. of H-Ala-Gly-Val-PEG·HCl. By corresponding reaction of this product with Z-Leu-OH, N-methylmorpholine and isobutyl chloroformate, cleavage of the protecting group and ultraftration there are obtained 3.5 g. of H-Leu-Ala-Gly-Val-PEG·HCl. The amino acid analysis of a sample of this product displays the following amino acid ratio:

Val:Gly:Ala:Leu=1.00:0.89:0.92:0.94

(c) 3.4 g. of H-Leu-Ala-Gly-Val-PEG·HCl are hydrolyzed with 62 ml. water and 1.25 ml. N potassium hydroxide in analogy to Example 1, section (c). After neutralisation, ultrafiltration and work-up there are obtained 163 mg. of crude tetrapeptide H-Leu-Ala-Gly-Val with an amino acid ratio of Val:Gly:Ala:Leu=1.00:0.94:0.96:0.96

The peptide content in the crude peptide material is 44% (amino acid analysis), the yield with regard to the first amino acid (Val) is 65%. The TLC-properties correspond to those of the previously described product.

EXAMPLE 10

4.0 g. of H-Gly-Val-PEG·HCl are dissolved in 25 ml. of dichloromethane, adjusted to pH 8–9 by the addition of N-methylmorpholine and treated with a solution of 700 mg. of Z-Leu-Ala-OH in 3 ml. of dimethylformamide. 230 mg. of N-hydroxysuccinimide and 420 mg. of DDC are added and the reaction mixture is stirred at room temperature for 6 hours. The reaction mixture is evaporated to dryness, the residue is dissolved in 200 ml. methanol, treated with 0.5 ml. of 4 N HCl/methanol and Pd/C and hydrogenated at room temperature and atmospheric pressure. The catalyst is filtered off, the filtrate is evaporated and the residue is taken up in 1 liter of water. The precipitate is separated and the filtrate is ultrafiltered and worked up. Yield: 3.8 g. of H-Leu-Ala-Gly-Val-PEG·HCl.

3.7 g. of H-Leu-Ala-Gly-Val-PEG·HCl are hydrolysed and worked up in analogy to Example 1, section (c). There are obtained 161 mg. of crude tetrapeptide H-Leu-Ala-Gly-Val-OH displaying an amino acid ratio of Val:Gly:Ala:Leu=1.00:0.97:0.86:0.83

The peptide content in the crude peptide material is 45%. Yield: 61% [based on the first amino acid (Val)].

EXAMPLE 11

(a) 20 g. of PEG MW 20,000 are reacted with 5.0 g. of Z-Pro-OH and 4.2 g. of DCC in analogy to Example 9, section (a). The reaction time is 13 days. After cleavage of the protecting group and diafiltration there are obtained 19.3 g. of H-Pro-PEG·HCl. The coupling efficiency is 50% or 0.05 mM./g. (amino acid analysis).

(b) 10 g. of H-Pro-PEG·HCl are dissolved in a mixture of 20 ml. of dichloromethane and 40 ml. of dimethylformamide. The solution is cooled to −30° and adjusted to pH 8 by the addition of 0.07 ml. of triethylamine. 700 mg. of Pyroglu-His-$N_2H_3$ are dissolved in a mixture of 10 ml. of dimethylsulfoxide, 10 ml. of dimethylformamide and 6.3 ml. of 2.4 N HCl/tetrahydrofuran at 0°. The solution is cooled to −20°, treated with 0.5 ml. of isoamyl nitrite, stirred for 30 minutes at −20° and neutralized by the addition of 2.1 ml. of triethylamine. The reaction mixture is then added to the H-Pro-PEG-solution at −30°. The reaction mixture is stirred for 30 minutes below 0° and for 15 hours at 4° and evaporated to dryness in vacuo. The residue is taken up in 1 liter of water, ultrafiltered through a Diaflo UM–10 filter and worked up. Yield: 9.9 g. of Pyroglu-His-Pro-PEG. The substance displays an amino acid ratio of Pro:Glu=1.00:0.65. This product is dissolved in 50 ml. of dichloromethane. The solution is adjusted to pH 8 and reacted with 700 mg. of Pyroglu-His-$N_2H_3$ as described before. After work-up there are obtained 9.5 g. of Pyroglu-His-Pro-PEG having an amino acid ratio of Pro:Glu=1.00:1.00.

(c) 5.0 g. of Pyroglu-His-Pro-PEG are dissolved in a mixture of 250 ml. methanol and 25 ml. of dichloromethane. The solution is saturated with dry $NH_3$ at −5°, left to stand at room temperature for 36 hours, saturated again with $NH_3$ at −5°, kept at room temperature for 4 days and finally evaporated to dryness in vacuo. The residue is dissolved in methanol, evaporated to dryness, dissolved in 750 ml. of water and ultrafiltered through a Diaflo UM–10 filter. To this end, the solution is first concentrated to a volume of 250 ml. and subsequently diafiltered with 1.5 liters of water. The filtrate is evaporated to dryness in vacuo, the residue is dissolved in 20 ml. of methanol, treated with charcoal, filtered, evaporated, dissolved in 100 ml. of water and lyophilized. Yield: 210 mg. of crude Pyroglu-His-Pro-$NH_2$. This material has an amino acid ratio of Pro:His:Glu=1.00:0:87:1.03

The peptide content in the crude material is 28% corresponding to 63% yield [calculated of the first amino acid (Pro)]. TLC corresponds to that of crude Pyroglu-His-Pro-$NH_2$ obtained by classical means using the same coupling.

What is claimed is:

1. A process for the preparation of peptides wherein an amino acid is coupled through a covalent bond selected from the group consisting of ester or amide bonds to a polymer selected from the group consisting of water soluble or organic solvent soluble polymers, the by-products and excess reagent are removed by dialysis or membrane filtration, additional amino acids are coupled stepwise in a homogeneous phase to said first amino acid-couple with removal of by-products and excess reagent as above after each coupling step until a desired peptide chain coupled to said polymer has been prepared and said peptide is removed from said polymer support.

2. The process of claim 1 wherein said polymer has a molecular weight in the range of from about 10,000 to 100,000.

3. The process of claim 2 wherein said polymer is selected from the group consisting of polyethyleneglycol; polyethyleneglycol esterified with citric acid; copolymers of polyethyleneglycol and succinic acid, of vinyl pyrrolidine and acrylic acid or β-hydroxy ethyl acrylate, or of acrylamide and partially saponified vinyl acetate.

4. The process of claim 2 wherein said polymer is polyethyleneglycol.

5. The process of claim 2 wherein said polymer is polyethyleneglycol esterified with citric acid.

6. The process of claim 2 wherein said polymer is a copolymer of polyethyleneglycol and succinic acid.

7. The process of claim 1 wherein said first amino acid is coupled to a polymer through an ester bond.

8. The process of claim 1 wherein said peptide is removed from said polymer by treatment with dilute alkali hydroxide solution and the peptide is separated from the polymer by selective filtration.

9. The process of claim 1 wherein said peptide is removed from said polymer by treatment with ammonia in an organic solvent and the peptide amide is separated from the polymer by selective filtration.

References Cited

UNITED STATES PATENTS

| | | | |
|---|---|---|---|
| 3,502,545 | 3/1970 | Westman et al. | 260—112.5 |
| 3,578,641 | 5/1971 | Johnson | 260—78 |

OTHER REFERENCES

Gren et al.: J. Chem. Soc., Sec. C, 1969, 401.

LEWIS GOTTS, Primary Examiner

R. J. SUYAT, Assistant Examiner

U.S. Cl. X.R.

260—2 EP, 75, 80.3, 85.7, 86.1